(No Model.)
D. RUDD.
FINGER BAR.
No. 466,428. Patented Jan. 5, 1892.
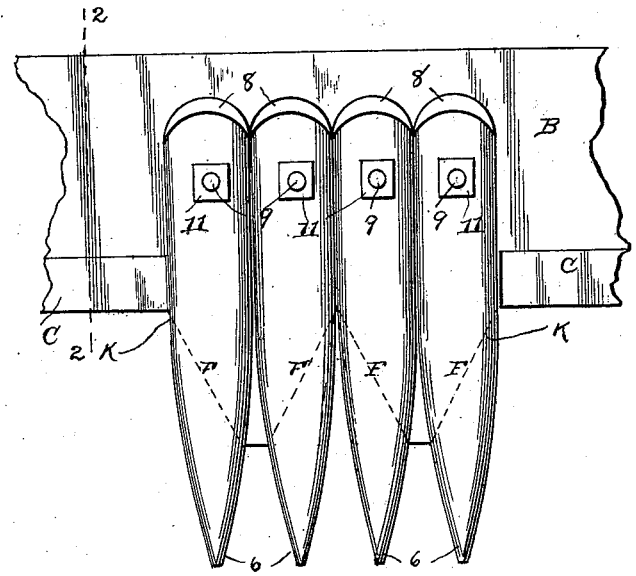
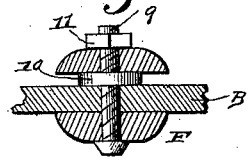
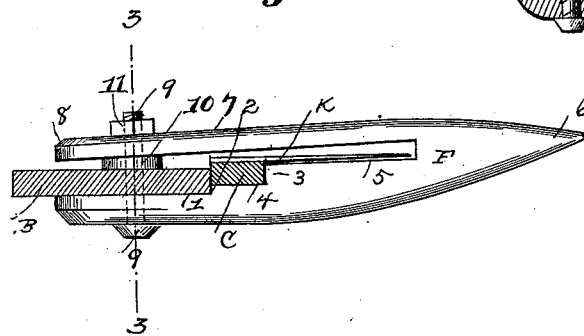
Witnesses
B. S. Ober
N. J. Collamer
Inventor
David Rudd,
By his Attorneys,
C. A. Snow & Co.

UNITED STATES PATENT OFFICE.

DAVID RUDD, OF LACONA, NEW YORK.

FINGER-BAR.

SPECIFICATION forming part of Letters Patent No. 466,428, dated January 5, 1892.

Application filed June 12, 1891. Serial No. 396,003. (No model.)

*To all whom it may concern:*

Be it known that I, DAVID RUDD, a citizen of the United States, residing at Lacona, in the county of Oswego and State of New York, have invented a new and useful Finger-Bar, of which the following is a specification.

This invention relates to harvesters and more especially to the cutting apparatus thereof, and the object of the same is to produce an improved guard-finger and method of attaching it to the finger-bar.

To this end the invention consists of the specific details of construction hereinafter more fully described in connection with their resultant advantageous functions, particularly pointed out in the claim, and illustrated on the sheet of drawings, wherein—

Figure 1 is a plan view of a section of a cutter-bar constructed in accordance with my invention. Fig. 2 is an enlarged cross-section thereof on the line 2 2 of Fig. 1. Fig. 3 is a vertical section on the line 3 3 of Fig. 2.

Referring to the said drawings, the letter B designates the finger-bar carrying the fingers F, and C is the cutter-bar moving against the front edge of the finger-bar and through the fingers and carrying the knives K, all these parts being of the usual and ordinary construction in the cutting apparatus used on harvesters, reapers, mowers, and other grass and grain cutting machines, with the exceptions hereinafter noted. Each finger is preferably half the width of each knife, and the fingers are so connected to the finger-bar K that they shall stand with their sides in contact. By making the fingers thus narrower than usual (*i. e*, one finger to each knife) and causing the cutter-bar to move through a distance equal to the breadth of one knife or of two fingers each edge of each knife makes two cuts, one against the edge of each of two fingers. In this way, also, the grass or grain is divided by the tips of the fingers into twice as many small bundles, each of which is only one-half the size of the divisions heretofore made, and hence while the stroke of each knife is divided its work is also divided and the same power will effect the same amount of work; but there is another advantage which must not be lost sight of and which results from this construction, and that is that where the fingers stand so close together and the spaces between them are so small many of the stones and other obstructions which heretofore passed between the fingers to the edges of the knives with disastrous results upon the latter are now too large to pass between the tips of the fingers. Hence the fingers ride over such obstructions and the knives are not dulled or broken. Moreover, as the liability to such obstruction and breaking is so materially lessened the cutter-bar can now be driven faster and the machine drawn faster over the ground to supply work for the rapidly-moving knives, and hence more work can be done by the machine than formerly and with less danger of accident to the operator or damage to the machine. Each finger F, passing at its rear end beneath the finger-bar B, as at 1, preferably has a small shoulder 2 standing against the front edge of the bar B, and has another shoulder 3, against which the front edge of the cutter-bar C moves, a seat 4 being formed between this shoulder 3 and the front edge of the finger-bar B and on which seat the cutter-bar C moves. Forward of the shoulder 3 is the usual slot 5 for the knives K, and at the front end of the finger is the usual sharp point or tip 6. The tongue 7, above the slot 5, heretofore extended to or perhaps a little over the cutter-bar C, but in the present case I extend it rearwardly to a point 8 above the rear end of the lower portion of the finger, as shown. A vertical bolt 9 passes upwardly, first through the lower portion 1 of the finger, then through the finger-bar B, then through a washer 10, and finally through the upper tongue 7 of the finger, the nut 11 being screwed upon the upper end of the bolt, as shown. When the seat 4 and the slot 5 become enlarged by wear, the bolt may be withdrawn and a new and slightly thinner washer 10 inserted, and when the bolt is replaced and its nut 11 tightened the upper tongue 7 will be drawn more closely to the lower portion 1 of the finger than formerly, and hence the size of the worn openings will be reduced. Considerable change in the details of construction may be made without departing from the spirit of my invention, and the uses and advantages resulting therefrom are thought to be obvious. Among others are mentioned that as the fingers are not open at their upper sides there is no chance for hay, sticks, or other obstructions falling upon the moving cutter-bar and clogging the apparatus, and by thus doubly connecting the rear ends of the fingers to the finger-bar they are more firmly braced than heretofore against vertical displacement, while lateral displacement is prevented by their sides coming in contact with each other. At the same time each finger is independently removable or adjustable in the size of its opening, and many other advantages will result which will be more obvious in practice and actual use than in theory or on paper.

What is claimed as new is—

In a cutting apparatus, the combination, with the finger-bar, fingers each of which has the rear end of its lower portion beneath the bar, a small shoulder standing against the front edge of the bar, another shoulder forward of said edge and forming a seat, a knife-slot forward of this shoulder, the tongue above said slot extending to the rear over the bar to a point above the rear end of the lower portion, a removable washer between said tongue and bar, and a bolt passing upwardly through the lower portion, the bar, the washer, and the tongue, of a cutter-bar reciprocating in said seat and knives carried by said cutter-bar and moving in the knife-slots in the fingers, substantially as described.

In testimony that I claim the foregoing as my own I have hereto affixed my signature in presence of two witnesses.

DAVID RUDD.

Witnesses:
S. C. HUNTINGTON, Jr.,
AZARIAH WEST.